Patented Feb. 19, 1946

2,395,060

UNITED STATES PATENT OFFICE 2,395,060

STABILIZING SHERBET COMPOSITIONS

Sidney Musher, New York, N. Y., assignor to Musher Foundation Incorporated, New York, N. Y., a corporation of New York No Drawing. Application July 29, 1944, Serial No. 547,301

12 Claims. (Cl. 99—136)

The present invention relates to a physically stabilized sherbet composition and sherbet stabilizer and to the method of making the same whereby the sherbet has highly desirable physical properties and characteristics.

The manufacture of an ice sherbet or milk sherbet of fine body and texture is very difficult because of the large number of factors that must be controlled and because of the variety of characteristics that must be produced.

For example, although gelatin is widely used as a complete stabilizer for ice cream, it is unsatisfactory as a complete stabilizer for sherbets and produces a sherbet of uncontrolled overrun, coarse texture and other undesirable characteristics.

An object of the present invention is therefore to produce a sherbet stabilizer and also to produce with that stabilizer a sherbet composition that has controlled overrun, or in which the amount of air incorporated in the sherbet during freezing is within the most highly desirable limits; to avoid bleeding or leakage of the melted ice crystals; to maintain excellent body and texture and other physical characteristics and to produce a sherbet that will resemble ice cream in its "feel" in the mouth, which objects are to be accomplished by economical and simple means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedures of the present invention, a combination of a special oat fraction and an aerating type stabilizer such as gelatin is utilized in a minor amount in the sherbet mix, preferably by first heating the combination in water or in milk with a small amount of a sugar and then adding to the sherbet mix and freezing.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that about 85% to 95% will pass through a screen or mesh or bolting cloth having a fineness in excess of about 60 mesh and desirably having a fineness in excess of 70 mesh.

The oat groats are ground as indicated above and the ground groats are then separated desirably by aspirating or otherwise by screening into two fractions, namely, a coarse fraction and a fine fraction, the coarse fraction comprising the minor fraction of less than about 15% by weight and most desirably comprising 5% to 15% of the fine fraction comprising at least 85% and most desirably between about 85% and 95% of the total weight of the ground oat groats.

It is the coarse residue which is left after such grinding and screening or bolting or particularly after aspirating which is found to have the properties most desirable for use in accordance with the present invention, and the desired effect is most particularly observed after the coarse fraction has all been ground to a fineness of at lease 50 mesh and most desirably to at least 60 mesh.

In the preferred procedure, the oat groats, after removal of the hulls, are pulverized or ground and then desirably by aspirating or less preferably by bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction, this fraction desirably to be ground to at least 50 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction.

According to one method of separating the relatively high starchy fraction which is necessary to obtain the gelatinous properties in most highly developed condition, the groats are ground so that at least about 85% will have a fineness in excess of about 60 mesh and desirably at least 60% to 70% of the ground material will have a sufficient fineness to go through about a 90 mesh screen.

Then the ground material is aspirated or less preferably screened to remove all particles which will not go through a 60 mesh screen.

A most highly desirable method is to grind the oat groats until between 85% and 90% will go through a 70 mesh screen but wherein the balance of between 10% and 15% remains on the screen. Then the ground groats are aspirated or screened to remove all the coarse particles and to separate the fine fraction comprising 85% to 90% from the coarse fraction comprising the balance of 10% to 15% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is desirably finely divided and may then be used in accordance with the procedures of the present invention, the unusual stabilizing properties now being present with the removal of the cellulosic hulls and the relatively high starch fraction of the oat groats.

These coarser particles in which the stabilizing properties are concentrated are most desirably ground such as in a hammer or stone or attrition mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

Although the chemical composition may vary it has been found that 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

In accordance with the procedures of the present invention, between about 1 and 5 parts and desirably between about 2 and 4 parts of an aerating type stabilizer are combined with each 3 parts of the special oat fraction to produce the stabilizer of the present invention and which stabilizer is used in the manufacture of the sherbet composition.

The aerating type stabilizer that is used for combination with the special oat fraction to produce the sherbet stabilizer of the present invention is a product which will readily whip or which readily incorporates air when subjected to agitation. The preferred aerating type stabilizers that are used are gelatin and locust bean gum although such special compositions as sodium carboxy methylcellulose may also be employed. The most desirable product for use in combination with the special oat fraction is, however, gelatin and combinations may be made as indicated below:

| | Percent |
|---|---|
| Type 1: | |
| Special oat fraction | 50 |
| Gelatin | 50 |
| Type 2: | |
| Special oat fraction | 40 |
| Gelatin | 40 |
| Locust bean gum | 20 |
| Type 3: | |
| Special oat fraction | 65 |
| Gelatin | 10 |
| Locust bean gum | 20 |
| Sodium carboxy methylcellulose | 5 |
| Type 4: | |
| Special oat fraction | 70 |
| Locust bean gum | 25 |
| Sodium carboxy methylcellulose | 5 |
| Type 5: | |
| Special oat fraction | 40 |
| Gelatin | 40 |
| Pectin | 20 |
| Type 6: | |
| Special oat fraction | 40 |
| Gelatin | 40 |
| Locust bean gum | 10 |
| Pectin | 10 |
| Type 7: | |
| Special oat fraction | 40 |
| Gelatin | 40 |
| Locust bean gum | 10 |
| Gum karaya | 10 |
| Type 8: | |
| Special oat fraction | 50 |
| Gelatin | 40 |
| Locust bean gum | 10 |

Where about 75% or more of the stabilizer comprises the mixture of the special oat fraction and the aerating type stabilizer such as gelatin, the balance may include other gums such as gum karaya, Irish moss, algin, agar, or pectin.

The preferable procedure is to use 1 part of the combination of the special oat fraction and the aerating type stabilizer with from 1 to 8 parts and preferably 1 to 4 parts of a sugar and from 5 to 20 parts and preferably 5 to 12 parts of water or milk, including skim milk and whole milk.

This combination is mixed thoroughly and heated to at least about 150° F. and desirably to 170° F. and preferably until visible thickening appears. The combination may then be cooled and added to the sherbet mix. The heating of the combined stabilizer and sugar in the water or milk or other aqueous composition may be conducted by the injection of steam or in steam jacketed pans or in other available manner.

It has been found that when this procedure is used most desirable physical characteristics are obtained and the results are superior to either where the special oat fraction is heated in water or milk alone or whereby any other method of processing is utilized.

By this means there are obtained properly controlled overrun, smoothness, elimination of bleeding or leakage, elimination of crystallization, and fine body and texture. In the case of milk sherbets where an overrun, for example, of 30% to 35% is desirable or in the manufacture of ice sherbets where an overrun of 20% to 25% is desirable it has been found that the combination of stabilizers herein described as well as the method of manufacturing produces the most desirable physical characteristics in both shortening the time required to produce and improving materially the quality of the milk sherbet or ice sherbet to produce an excellently bodied product.

By the term "sherbet" or "sherbet composition" there are included both the so-called milk sherbets as well as the ice sherbets. For example, the milk sherbets include the frozen product made from milk products, water, sugar, fruit, flavoring or coloring and with the stabilizer set forth herein and the freezing of which has been accompanied by agitation of the ingredients. Milk sherbets will contain not to exceed about 8% by weight of milk-solids-not-fat and generally will contain relatively no butterfat although up to about 1% to 2% butterfat may be present. Ice sherbet includes the frozen product made from water, sugar, with fruit, flavoring and coloring as well as with the stabilizer set forth herein and in the manufacture of which the freezing has been accompanied by agitation of the ingredients. The ice sherbet contains no milk solids. Although milk sherbet and ice sherbet generally are made at a relatively low pH such as at between about pH 2.5 and pH 4.0 and preferably between pH 2.8 and pH 3.6, where the fruits give insufficient acidity to produce this pH, citric acid, tartaric acid, phosphoric acid, or similar edible acid may be added.

Among the sugars that may be utilized are included such sweetening agents as cane sugar, corn sugar, beet sugar, invert sugar, honey, dextrose, etc. Flavoring materials may include essential oils, fruit and fruit extracts such as raspberries, strawberries, cherries, bananas, citrus products, citrus concentrates, fresh and frozen fruits, preserved and canned fruits.

The sherbet mix may be pasteurized at, for example, 145° F. for 30 minutes or at 165° F. for 15 to 25 minutes and then cooled and frozen with agitation.

A highly desirable milk sherbet formula is given below.

| | | |
|---|---|---|
| Skim milk | lbs | 10 to 16 |
| Sugar | lbs | 14 |
| Special oat fraction | ounces | 2 |
| Gelatin | do | 2 |
| 50% citric acid solution or equivalent | do | 3–4 |

Fruit, color and water to make 5 gallons.
The 14 lbs. of sugar include the sugar in the fruit added.

The following formula is given for a typical ice or ice sherbet:

| | | |
|---|---|---|
| Sugar | lbs | 14 |
| Special oat fraction | ounces | 2 |
| Gelatin | do | 2 |
| 50% citric acid solution or equivalent | do | 3–4 |

Fruit, color and water to make 5 gallons.
The 14 lbs. of sugar include the sugar in the fruit added.

In both cases, as indicated above, the special oat fraction and gelatin are combined as, for example, with 1 pound of sugar, mixed thoroughly, and then heated in three quarts of water or skim milk to about 170° F. or more until visible thickening appears. The mixture is then cooled and added to the milk sherbet or ice sherbet mix, followed by pasteurizing where desired and freezing with agitation.

The particularly desirable feature of the present invention is that the milk sherbet or ice sherbet may be completely stabilized to produce a product of excellent physical characteristics and yet within the legal limits of 0.5% total stabilizer which includes the combination of the special oat fraction and are aerating type stabilizer set forth above. Where desired and where permissible, the amount of the combination of the special oat fraction and the aerating type stabilizer may be increased or decreased such as, for example, to between about 0.3% and 1.0% of the combined stabilizer ingredients, but the preferred amount to use is between about 0.4% and 0.6% and preferably 0.5% against the total weight of the mix ingredients of the milk sherbet or ice sherbet.

By the term "mix ingredients" is meant the usual ingredients employed in the manufacture of milk sherbet or ice sherbet such as milk, water, sugar, flavor, fruit, acid, stabilizer, etc.

Where desired, the fat may be extracted from the finely divided special oat fraction of the present invention such as by treatment of the special oat fraction or of the finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

By the term "finely divided" as used in connection with the special oat fraction of the present invention in the application and claims is meant the oat fraction which has been subdivided to a state of fineness that will enable it to go through at least about a 50 mesh screen.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water.

By the term "total protein" is meant the total amount of protein present in the special oat fraction of the present invention.

In the production of the special oat fraction as the preferred procedure, the whole oats are dehulled in their "green" or undried condition, which is quite different from the operation normally utilized in dehulling procedures and particularly in the dehulling of oats. In other words, the oats are desirably not subjected to any drying or desiccating or roasting procedures as is commonly done in the treatment of whole oats before the hulls are removed.

Where, however, the whole oats are to be dried from, for example, 12% to 13% of moisture content to 6% to 7% or less of moisture content, it is preferable for the drying operation to be carried out at a temperature not exceeding about 170° F. and preferably not exceeding about 150° F. Roasting of the oats or drying of the oats at a temperature of over 170° F. is preferably to be avoided.

The whole oats may less desirably be desiccated or dried in the normal manner by placing in open pans which are steam jacketed until they are dried to a moisture content of less than about 7% but this is a less preferable procedure.

As indicated above, the preferred procedure is to use "green" oats and by which term is included the substantially undried oats. By the use of these "green" oats and with the further processing more particularly set forth herein, a greatly improved final product is obtained and a product having higher viscosity characteristics and greater physical stabilization characteristics.

The oats are then dehulled preferably without damage or change to the oat groat fraction so that only the hulls themselves are removed leaving the whole oat groat which oat groats have desirably not been subjected to a temperature in excess of 170° F. and preferably to not over 150° F.

In the preferred procedure, the oat groats, after removal of the hulls, are pulverized or ground and then desirably by aspirating or less preferably by bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction, this fraction desirably to be ground to at least 60 mesh for use in accordance with the procedures of the present invention.

Another method that may be followed for the preparation of the special oat fraction of the present invention is to first clip the whole oats containing the hulls to remove both the hulls and the upper 10% and preferably the upper 5% as well as the lower 10% and preferably the lower 5% of the elongated fraction of the oat groats. These upper and lower fractions of the oat groats together with the oat hulls may then be aspirated to separate the hull fraction, and the upper and lower oat groat fractions which have been removed from the hulls may then be finely divided to at least about 50 mesh and desirably to about 60 mesh to produce the special oat fraction. After removal of the hulls desirably by aspiration the remaining substantially hull-free fraction may then be further aspirated or bolted to remove between about 25% and 50% of the finer fraction or the hull-free fraction may be aspirated or bolted or otherwise processed to separate the low protein fraction in order to leave behind the fraction which contains in excess of 20% and desirably in excess of 22% total protein. The high protein fraction or the coarse fraction thus obtained may then be finely divided for use in accordance with the procedures herein set forth.

The present application is a continuation in part of application, Serial No. 510,831 filed November 17, 1943 entitled "Oat product," now Patent No. 2,355,028; and is a continuation of application, Serial No. 534,164 filed May 4, 1944 entitled "Thickened aqueous composition and method of making the same," now Patent No. 2,355,029; and also is a continuation of application, Serial No. 534,163 filed May 4, 1944 entitled "Food composition," now Patent No. 2,355,030, all of which patents were issued on August 1, 1944. The present application is likewise a continuation of all the applications which matured on August 1, 1944 into Patents Nos. 2,355,031, 2,355,032 and 2,355,033.

Having described my invention, what I claim is:

1. A sherbet composition comprising as an ingredient a small amount of a combination of an aerating type stabilizer selected from the group consisting of gelatin, locust bean gum and sodium carboxy methylcellulose, and a finely divided, dry milled oat product, said oat product containing in excess of about 20% total protein and said oat product having a relatively low starch and a relatively high protein content as compared to dehulled oats.

2. A sherbet composition comprising as an ingredient a small amount of less than 1% of a combination of an aerating type stabilizer selected from the group consisting of gelatin, locust bean gum and sodium carboxy methylcellulose and a dry milled oat product, said dry milled oat product having a fineness of at least 60 mesh and said product containing in excess of about 20% total protein and said oat product having a relatively low starch and a relatively high protein content as compared to dehulled oats.

3. A sherbet composition comprising as an ingredient a small amount of less than 1% of a combination of an aerating type stabilizer selected from the group consisting of gelatin, locust bean gum and sodium carboxy methylcellulose, and the finely divided, coarse fraction of dehulled oats, said fraction having a fineness of at least about 60 mesh, said fraction containing in excess of about 22% total protein, said fraction being free of those particles which will go through a 60 mesh screen when the dehulled oats are pulverized to a fineness that will permit 80% to 90% thereof to pass through a 60 mesh screen.

4. A sherbet composition comprising as an ingredient a small amount of less than 1% of a combination of an aerating type stabilizer selected from the group consisting of gelatin, locust bean gum and sodium carboxy methylcellulose and the finely divided coarse fraction of dehulled oats, said fraction containing in excess of about 22% total protein, said fraction being free of those particles which will go through a 60 mesh screen when the dehulled oats are pulverized to a fineness that will permit about 80% to 90% thereof to pass through a 60 mesh screen.

5. A milk sherbet comprising as an ingredient approximately equal quantities of an aerating type stabilizer selected from the group consisting of gelatin, locust bean gum and sodium carboxy methylcellulose, and the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen.

6. A milk sherbet comprising as an ingredient approximately equal quantities of an aerating type stabilizer selected from the group consisting of gelatin, locust bean gum and sodium carboxy methylcellulose, and the finely divided coarse fraction of dehulled oats, said finely divided coarse fraction being substantially free of those particles which will go through a 60 mesh screen when the dehulled oats are pulverized to a fineness that will permit about 80% to 90% thereof to pass through a 60 mesh screen.

7. A method of producing a sherbet composition which comprises preparing a combination of the finely divided coarse fraction of dehulled oats and an aerating type stabilizer selected from the group consisting of gelatin, locust bean gum and sodium carboxy methylcellulose, heating the said combination with sugar in an aqueous material selected from the group consisting of water and milk to a temperature of at least 150° F., adding the said heated combination to the mix ingredients of a sherbet composition and then freezing the combination with agitation, said finely divided coarse fraction being substantially free of those particles which will go through a 60 mesh screen when the dehulled oats are pulverized to a fineness that will permit a major proportion thereof to pass through a 60 mesh screen, and then pasteurizing and freezing the composition.

8. A method of producing a sherbet composition which comprises preparing a combination of the finely divided coarse fraction of dehulled oats and an aerating type stabilizer selected from the group consisting of gelatin, locust bean gum and sodium carboxy methylcellulose, heating the said combination with sugar in an aqueous material selected from the group consisting of water and milk to a temperature of at least 150° F., adding the said heated combination to the mix ingredients of a sherbet composition and then freezing the combination with agitation, said finely divided coarse fraction being substantially free of those particles which will go through a 60 mesh screen when the dehulled oats are pulverized to a fineness that will permit about 80% to 90% thereof to pass through a 60 mesh screen, and said finely divided coarse fraction containing in excess of about 20% total protein.

9. A method of producing a sherbet composition which comprises preparing a combination of the finely divided coarse fraction of dehulled oats and an aerating type stabilizer selected from the group consisting of gelatin, locust bean gum and sodium carboxy methylcellulose, heating one part of the said combination with from 1 to 8 parts of a sugar and in from 5 to 20 parts of an aqueous material selected from the group consisting of water or milk to a temperature of at least about 150° F. and then freezing the combination with agitation, said finely divided coarse fraction being substantially free of those particles which will go through a 60 mesh screen when the dehulled oats are pulverized to a fineness that will permit about 80% to 90% thereof to pass through a 60 mesh screen, and said finely divided coarse fraction containing in excess of about 20% total protein.

10. A sherbet stabilizer comprising an aerating type stabilizer selected from the group consisting of gelatin, locust bean gum and sodium carboxy methylcellulose and a finely divided, dry milled oat product, said oat product containing in excess of about 20% total protein and said oat product having a relatively low starch and a relatively high protein content as compared to dehulled oats.

11. A sherbet stabilizer comprising an aerating type stabilizer selected from the group consisting of gelatin, locust bean gum and sodium carboxy methylcellulose and the finely divided, coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 80% to 90% thereof to pass through a 60 mesh screen.

12. A sherbet stabilizer comprising a combination of between 1 and 5 parts of an aerating type stabilizer selected from the group consisting of gelatin, locust bean gum and sodium carboxy methylcellulose and 3 parts of a finely divided, dry milled oat product, said oat product containing in excess of about 20% total protein and said oat product having a relatively low starch and a relatively high protein content as compared to dehulled oats.

SIDNEY MUSHER.